April 18, 1939. L. P. CROSMAN Re. 21,050

LISTING ADDING MACHINE

Original Filed Jan. 15, 1938 2 Sheets-Sheet 1

Inventor

LORING P. CROSMAN,

E. W. Anderson & Son.

Attorney

April 18, 1939. L. P. CROSMAN Re. 21,050

LISTING ADDING MACHINE

Original Filed Jan. 15, 1938 2 Sheets-Sheet 2

Inventor

LORING P. CROSMAN.

E. W. Anderson & Son

Attorney

Reissued Apr. 18, 1939

Re. 21,050

UNITED STATES PATENT OFFICE 21,050

LISTING ADDING MACHINE

Loring Pickering Crosman, Maplewood, N. J., assignor to Monroe Calculating Machine Company, Orange, N. J., a corporation of Delaware Original No. 2,118,700, dated May 24, 1938, Serial No. 185,241, January 15, 1938. Application for reissue January 13, 1939, Serial No. 250,857

9 Claims. (Cl. 197—128)

The invention relates to listing adding machines, embodying certain improvements of the paper feeding means disclosed in the U. S. Patents Numbers 1,945,026, dated January 30, 1934, and 2,081,423, dated May 25, 1937, to Loring P. Crosman, an object of the invention being to provide means cooperating with a carriage shifting tape for moving normally disengaged statement feeding rolls into engagement and a pressure roll normally engaged with the platen away therefrom. Another object is to provide carriage controlled means of this description. Other objects and advantages will appear hereinafter.

The invention consists in the novel construction and combinations of parts as hereinafter set forth in the claims.

Figure 4:
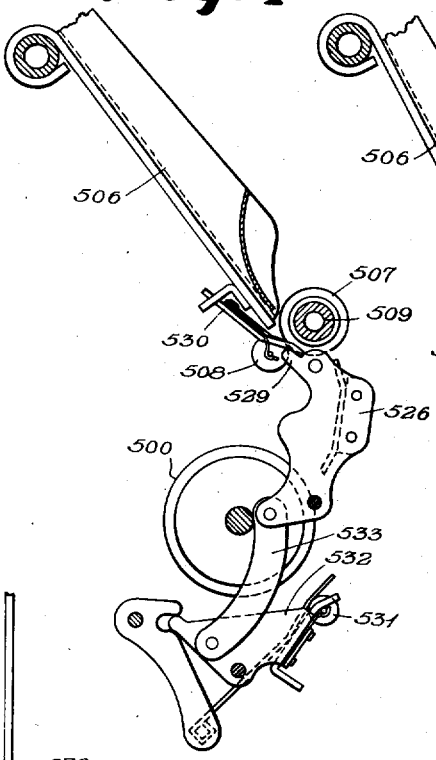
Fig. 4 is a similar view with the carriage in open position.
Figure 3:
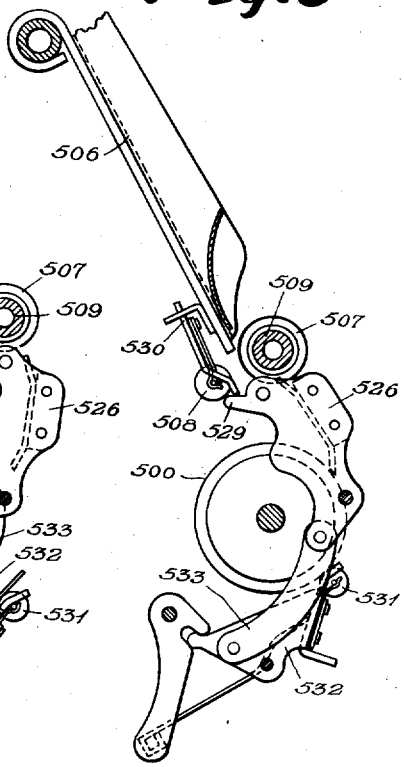
Fig. 3 is a vertical section taken through the platen and feed roll mechanism with the carriage shown in closed position, parts being broken away.

In these drawings, the numeral 500 (Figs. 3 and 4) designates a cylindrical platen, mounted in a shiftable carriage and provided with the usual line spacing, carriage stepping and tabulating mechanisms. During the printing operation, a statement sheet passing around the platen is held thereagainst by pressure roll 531, said roll being mounted upon bell lever plates 532 which are movable to bring said pressure roll out of contact with the platen when a statement sheet is to be ejected from the machine and a new statement sheet is to be inserted. In this movement of lever plates 532, a pair of paper feed rolls 507, 508, normally held apart, (Fig. 3), are brought into contact with each other, (Fig. 4), whereupon rotation of the feed roll 507 will feed the statement sheet between rolls 507, 508 out of or into the machine.

The paper rests upon guides 506 carried by a frame which is adjustable relatively to the frame of the platen carriage proper, said paper guide frame being connected to the carriage frame by pivotal links 526 (Figs. 1 and 2) and to the plates 532 by links 533.

Means described as follows are provided to adjust said paper guide frame relative to the carriage frame to thereby adjust the rolls 507, 508 and 531 as stated.

Figures 1, 2:
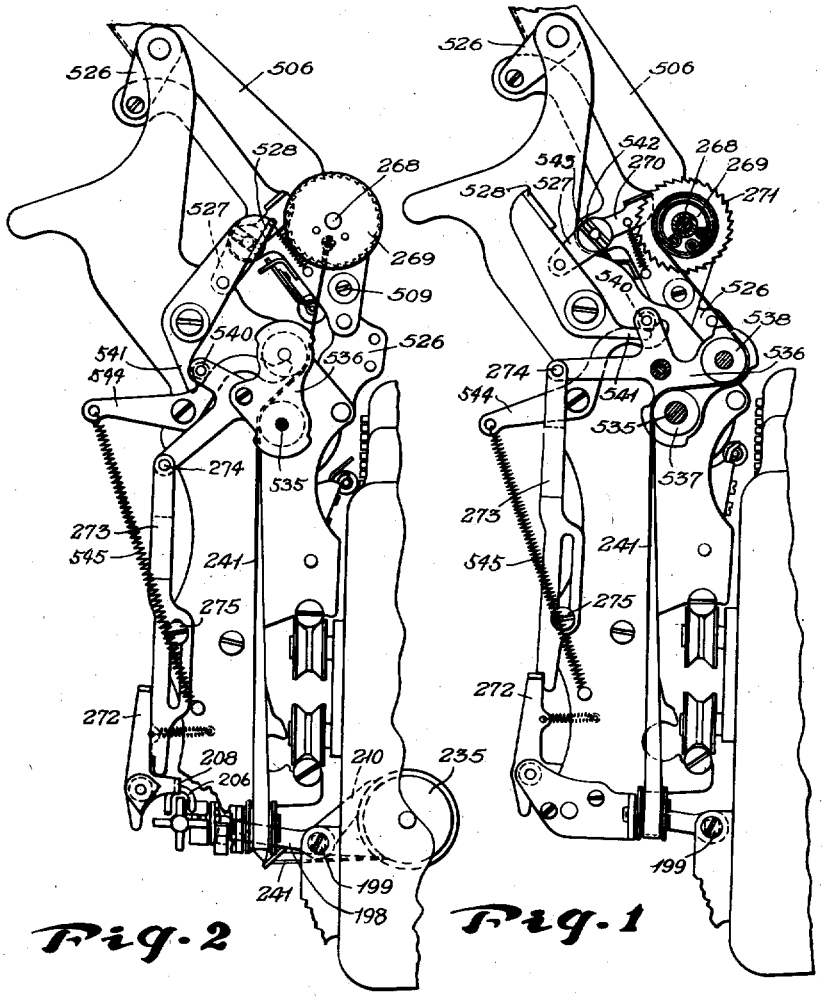
Fig. 1 is a left side elevation of the platen carriage and rear portion of the machine with the carriage shown in closed or normal operating position, parts being broken away.
Fig. 2 is a similar view with the carriage shown as in open or statement sheet feeding position.

A toggle joint 527 one link of which is pivoted to the carriage frame and the other link to the paper guide frame connects these two frames, said toggle joint being located in the bowed position of Fig. 1 when the carriage is in normal closed position, that is to say in position with the pressure roll 531 contacting the platen and the feed rolls 507, 508 spaced apart from each other. Alignment of the links of the toggle joint 527 into the position of Fig. 2 will adjust the paper guide frame relative to the carriage frame upon the pivotal links 526, and due to the links 533 connecting the forward of the links 526 with bell lever plates 532, the latter will be moved to adjust the pressure roll 531 away from the platen. In this adjustment of the paper guide frame and consequent movement of the pivotal links 526, projections 529 of the forward of said links will engage a spring retracted plate 530, upon which the feed roll 508 is mounted, said plate 530 being moved to force said feed roll 508 into contact with feed roll 507 against the tension of the spring of said plate. Feed roll 507 is mounted upon shaft 509 journaled in the paper guide frame.

The carriage is opened automatically, in connection with means for automatically ejecting a statement sheet from the machine and may be closed by the operator through manipulation of a thumb lug 528 of one of the links of the toggle joint 527.

Tape 241, passing around and between two rolls 537, 538, is fastened at one end to drum 269, fast upon shaft 268, which has suitable gear connection with the shaft 509 upon which the feed roll 507 is mounted. The other end of this tape is attached to motorized drum 235.

A spring tensioned pawl 270, normally engages ratchet teeth 271 of said drum 269, the carriage being in closed position, to thereby prevent rotation of said drum.

Rolls 537, 538 are mounted on rock levers 536, 536, fulcrumed at 535 on the carriage frame, and the carriage being in normal closed position (Fig. 1), as the tape 241 is wound upon the aforesaid drum 235, (drum 269 being temporarily held against rotation) said rock lever will be moved counter-clockwise by the pull of said tape, due to a substantially right angle bend formed in said tape by said rolls.

Rock levers 536 are normally held against such counterclockwise movement by means of a spring tensioned latch lever 272, engaging a suitable notch in a link 273, said link having its its upper end pivotal connection 274 with an arm of the right hand rock lever 536, and at its lower end pin and slot guiding connection 275 with the carriage frame.

As described in the aforesaid patents, the feeding of a statement sheet into the machine will cause winding of the tape 241 upon the drum 269, and upon completion of an operating cycle the platen carriage will be shifted to the left under the influence of the usual spring tensioned drum, (not shown). As the carriage reaches a desired left hand position, a cam shoe 195 (Fig. 5) mounted on the carriage will contact roll 197 mounted upon arm 198 fast upon squared shaft 199 journaled in the main frame of the machine. Engagement of said cam shoe 195 with said roller 197 will rock arm 198 downwardly, and bring roll 197 into the path of movement of the cam surface 200 of a bell lever 201 fulcrumed at 202 to said carriage, thereby rocking bell lever 201 counterclockwise as viewed in Fig. 5. Pivoted to bell lever 201 at 201' is a transversely extending rod 203, said rod being pivoted at its left hand end to a bell lever 204, the latter being also fulcrumed to said carriage at 205. Rod 203 has at its free end a projection or offset 206 normally underlying the cam surface 207 of an arm 208 of latch lever 272, and as the bell lever 201 is rocked counterclockwise as stated, the projection 206 of said rod will contact the cam surface 207 of latch lever 272 to thereby disengage said latch lever from said link 273.

During the aforesaid movement of rod 203, bell lever 204 will be rocked counter clockwise as viewed in Fig. 5 to bring the cam surface 209 thereof into position to contact roller 197 for the purpose hereinafter stated.

Fast upon the squared shaft 199 is a clutch control arm 210, adapted during the aforesaid movement of said shaft to determine the subsequent operation of suitable clutch mechanism described in said Patent 2,081,423 to initiate power drive to drum 235 during the cycling of the machine.

Operation of said drum 235 will cause the tape 241 to be wound thereon, and since the drum 269 to which the other end of said tape is attached is temporarily held against rotation by pawl 270 engaging the ratchet teeth of said drum the pull of said tape passing as aforesaid in a substantially right angle bend around rolls 537, 538, will cause the rock levers 536 to be moved counterclockwise as viewed in Fig. 1, whereupon roller 540 of an arm of said lever, having engagement with tail arm 541 of one of the links of the toggle joint 527, will move said toggle joint from bowed to aligned position to thereby move the feed roll 508 into contact with the roll 507 for statement sheet ejecting purposes and the pressure roll 531 away from the platen. During this movement the pawl 270 which has been in engagement with the ratchet teeth of the drum 269 will be released from such engagement due to pin 542 engaging said pawl, said pin passing transversely through the pivot rod to which one of the links of the toggle joint 527 is fastened and having a limited movement within a diametric notch 543 of the hub of said pawl, the lost motion of the pin in the notch being adapted to hold the engagement of the pawl 270 with the teeth of drum 269 for a sufficient length of time to permit the levers 536 to be rocked by the pull of the tape 241 prior to action of said tape upon the drum 269.

The first action of drum 235 upon release of pawl 270 will be to open the carriage; next to rotate drum 269, ejecting the statement sheet from the machine, after which the tape 241 will be completely unwound from drum 269 and upon continued operation of drum 235 the carriage will be shifted to the right.

Figure 5:
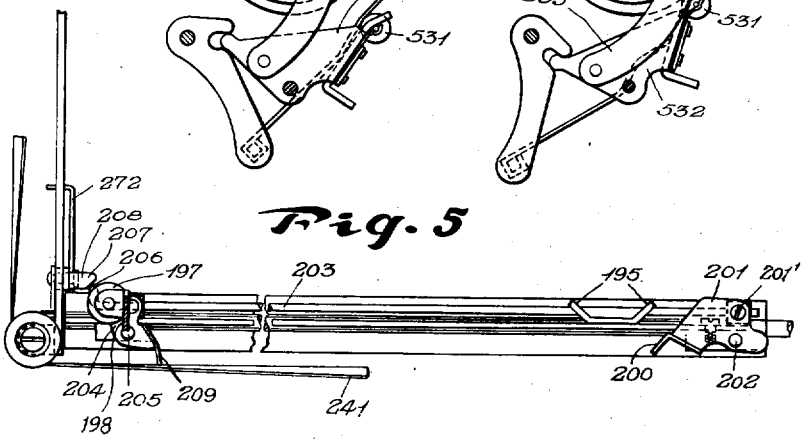
Fig. 5 is a detail front elevation of a portion of the carriage showing certain control cams mounted thereon, etc., parts being broken away.

As the carriage is thus returned to its normal position, cam surface 209 of bell lever 204 (said lever having been adjusted as previously stated) will contact roll 197 of arm 198, thereby rocking bell lever 204 reversely or clockwise, as seen in Figure 5, to release projection 206 from spring tensioned latch lever 272 and also restoring arm 198 and roll 197 thereof to raised position, whereby the arm 210 is reversely operated to disconnect the motor drive.

The rock levers 536 are restored to normal raised position by the tail arm 541 of one of the links of said toggle joint, in which position it will be held by the latch lever 272. Upon disengagement of the latch, rock levers 536 are held against spring tension on the tape 241 by a lever 544, one arm of which engages the roller 540 of a rock lever 536 and the other arm of which has connected thereto a spring 545.

An important application of the invention is to bookkeeping work, wherein one or more items are to be entered upon a statement sheet showing the condition of an account. After the items are entered, the platen carriage is tabulated to total taking position, wherein the cams 195 and 200 will operate arm 198 and lever 201, so that the statement sheet will be ejected and the carriage returned to the right during the total taking operation.

It will be observed that if arm 198 is rocked, but roller 197 is not brought against cam 200 to release latch lever 272, consequent motor operation of drum 235 will act to return the carriage to the right, without ejecting the paper. In the bookkeeping machine above referred to, this operation may be controlled by a carriage return key, depressed simultaneously with the item entering key in printing the last item of a given line, where additional items are to be entered on another line.

I claim:

1. In a listing adding machine having a platen, a shiftable platen carriage, and paper feeding means including a pair of normally disengaged rolls and a pressure roll normally engaging the platen, and means for shifting said carriage including a unitary element; means cooperating with said unitary element for moving said disengaged rolls into engagement and said pressure roll away from the platen.

2. In a listing adding machine having a platen, a shiftable platen carriage, paper feeding means including a pair of normally disengaged rolls and a pressure roll normally engaging the platen, and means for shifting said carriage including a unitary element; carriage controlled means cooperating with said unitary element for moving said disengaged rolls into engagement and said pressure roll away from the platen.

3. In a listing adding machine having a platen, paper feeding means including a pair of normally disengaged rolls and a pressure roll normally engaging the platen; means including a tape and a device for forming a bend in said tape for moving said disengaged rolls into engagement and said pressure roll away from the platen.

4. In a listing adding machine having a platen, a shiftable platen carriage, paper feeding means including a pair of normally disengaged rolls and a pressure roll normally engaging the platen, and means for shifting said carriage including a tape; means cooperating with said tape for moving said disengaged rolls into engagement and said pressure roll away from the platen.

5. In a listing adding machine having a platen, a shiftable platen carriage, paper feeding means including a pair of normally disengaged rolls and a pressure roll normally engaging the platen, and means for shifting said carriage including a tape; carriage controlled means cooperating with said tape for moving said disengaged rolls into engagement and said pressure roll away from the platen.

6. In a listing adding machine having a platen, a shiftable platen carriage, paper feeding means including a pair of normally disengaged rolls and a pressure roll normally engaging the platen, and means for shifting said carriage including a tape; means cooperating with said tape for moving said disengaged rolls into engagement and said pressure roll away from the platen including a device for forming a bend in the tape.

7. In a listing adding machine having a platen, a shiftable platen carriage, paper feeding means including a pair of normally disengaged rolls and a pressure roll normally engaging the platen, and means for shifting said carriage including a tape; means cooperating with said tape for moving said disengaged rolls into engagement and said pressure roll away from the platen including a settable device for forming a bend in the tape and means operable as the carriage shifts for controlling the operation of said settable device.

8. In a listing adding machine having a platen, a shiftable platen carriage, paper feeding means including a pair of normally disengaged rolls and a pressure roll normally engaging the platen, and means for shifting said carriage including a tape and two rolls to which the ends of said tape have connection; means cooperating with said tape for moving said disengaged rolls into engagement and said pressure roll away from the platen including a settable device for forming a bend in the tape, a latch for holding said settable device in normal position, means for temporarily holding one of the tape-connected rolls against movement in one direction, and means operable as the carriage shifts for releasing said latch and for releasing said holding means.

9. In a listing adding machine having a platen, a shiftable platen carriage, paper feeding means including a pair of normally disengaged rolls and a pressure roll normally engaging the platen, and means for shifting said carriage including a tape and two rolls to which the ends of said tape have connection; means cooperating with said tape for moving said disengaged rolls into engagement and said pressure roll away from the platen including a settable device for forming a bend in the tape, means for temporarily holding one of the tape connected rolls against movement in one direction, and means operable as the carriage shifts for controlling the operation of said settable device and said holding means.

LORING PICKERING CROSMAN.